(12) United States Patent
Lin et al.

(10) Patent No.: US 9,525,892 B2
(45) Date of Patent: Dec. 20, 2016

(54) VIDEO IMAGE DISTRIBUTION METHOD

(71) Applicant: Linknext Technologies Co., LTD., New Taipei (TW)

(72) Inventors: Shu-Yu Lin, New Taipei (TW); Che-Yuan Yen, New Taipei (TW); Chung-Kuang Chen, New Taipei (TW)

(73) Assignee: NEXTDRIVE INC., Grand Cayman (KY)

( * ) Notice: Subject to any disclaimer, the term of this patent is extended or adjusted under 35 U.S.C. 154(b) by 385 days.

(21) Appl. No.: 14/288,144

(22) Filed: May 27, 2014

(65) Prior Publication Data

US 2015/0350518 A1    Dec. 3, 2015

(51) Int. Cl.

| | |
|---|---|
| H04N 21/00 | (2011.01) |
| H04N 21/2183 | (2011.01) |
| H04N 21/422 | (2011.01) |
| H04N 21/4223 | (2011.01) |
| H04N 21/437 | (2011.01) |
| H04N 21/443 | (2011.01) |
| H04N 21/643 | (2011.01) |
| H04N 21/8545 | (2011.01) |
| H04N 21/858 | (2011.01) |
| H04N 21/239 | (2011.01) |
| H04N 21/2743 | (2011.01) |

(52) U.S. Cl.
CPC ........ *H04N 21/2183* (2013.01); *H04N 21/239* (2013.01); *H04N 21/2743* (2013.01); *H04N 21/4222* (2013.01); *H04N 21/4223* (2013.01); *H04N 21/437* (2013.01); *H04N 21/4431* (2013.01); *H04N 21/64322* (2013.01); *H04N 21/858* (2013.01); *H04N 21/8545* (2013.01)

(58) Field of Classification Search
CPC .......................... H04N 21/2183; H04N 21/239
USPC .......................................................... 348/61
See application file for complete search history.

(56) References Cited

U.S. PATENT DOCUMENTS

| | | | |
|---|---|---|---|
| 6,356,309 B1 * | 3/2002 | Masaki | G06T 9/005 348/439.1 |
| 2009/0164655 A1 * | 6/2009 | Pettersson | H04L 65/4015 709/231 |

* cited by examiner

*Primary Examiner* — Jeffery Williams
(74) *Attorney, Agent, or Firm* — Muncy, Geissler, Olds & Lowe, P.C.

(57) ABSTRACT

A video image distribution method used in a mobile electronic device is disclosed to include the step of controlling the video camera and starting image capture execution command, the step of temporarily storing original video camera images, the step of enabling the proprietary camera layer to use resource images for the creation of an image processing chain, the step of allocating hardware and software resources and constructing an image processing node Then enabling image processing chain to add source images to multiple processed images for storage, and the step of creating an application user linked service execution command and distributing temporarily stored multiple images to multiple application users. As long as the hardware and software resources permit, the method of the invention can serve multiple application users to meet different needs of different application users for different format settings, achieving optimal results, and facilitating operation of the mobile electronic device.

17 Claims, 8 Drawing Sheets

VIDEO IMAGE DISTRIBUTION METHOD

BACKGROUND OF THE INVENTION

1. Field of the Invention

The present invention relates to video image distribution technology and more particularly, to a video image distribution method for use in a mobile electronic device, which includes the step of controlling the video camera and starting image capture execution command, the step of temporarily storing original video camera images, the step of enabling the proprietary camera layer to use resource images for the creation of an image processing chain, the step of allocating hardware and software resources and constructing an image processing node, and then enabling image processing chain to add source images to multiple processed images for storage, and the step of creating an application user linked service execution command and distributing temporarily stored multiple images to multiple application users.

2. Description of the Related Art

Modern electronic technology and multimedia technology are continuously flourishing, general handheld or mobile electronic devices (such as smart phones, tablet computers, notebook computers, etc.) have become immensely popular in nearly all corners of the world. With the popularity of the Internet, there are more and more users choose to use instant communication interfaces (such as Skype, Line, Viber, Yahoo Messenger, etc.) as calls, text chat or video instant communication bridge Internet the popularity of the network, there are more and more users choose real-time communication interfaces (such as Skype, Line, Viber, Yahoo Messenger, etc.) for calls, real-time text chat or video communication, further shortening the distance between people.

However, current handheld or mobile electronic devices are mainly operated by an operating system to drive a video camera to capture user images and to send captured images through the Internet to other users on real time, thereby getting video capabilities. However, subject to the restrictions on the hardware and software itself, the operating system (such as Android, iOS, Windows Phone, etc.) of a handheld or mobile electronic device only checks whether there are other programs have used the video camera. Because the video camera hardware can simply serve only one single program user at one same time and can run only on one single image format setting (such as resolution, frame rate, etc.), the video camera hardware will be unable to run if multiple users simultaneously open the video camera and make different format settings.

Therefore, how to effectively solve the problem of format setting conflict when multiple program users access to one single camera is an important subject to be improved.

SUMMARY OF THE INVENTION

The present invention has been accomplished under the circumstances in view. It is therefore the main object of the present invention to provide a video image distribution method, which is used in a mobile electronic device that comprises a hardware platform, an operating system installed in the hardware platform and having built therein a proprietary camera layer and a driver, and an image capture interface. The driver of the operating system is controlled to receive video images from a video camera through the image capture interface, and to transmit received video images to the proprietary camera layer for dynamically creating image processing chains and multiple images queues for distribution to multiple application users. The method comprises the step of controlling the video camera and starting image capture execution command, the step of temporarily storing original video camera images, the step of enabling the proprietary camera layer to use resource images for the creation of an image processing chain, the step of allocating hardware and software resources and constructing an image processing node, and then enabling image processing chain to add source images to multiple processed images for storage, and the step of creating an application user linked service execution command and distributing temporarily stored multiple images to multiple application users. As long as the hardware and software resources permit, the method of the invention can serve multiple application users to meet different needs of different application users for different format settings, achieving optimal results, and facilitating operation of the mobile electronic device.

DETAILED DESCRIPTION OF THE PREFERRED EMBODIMENT

Figure 1:
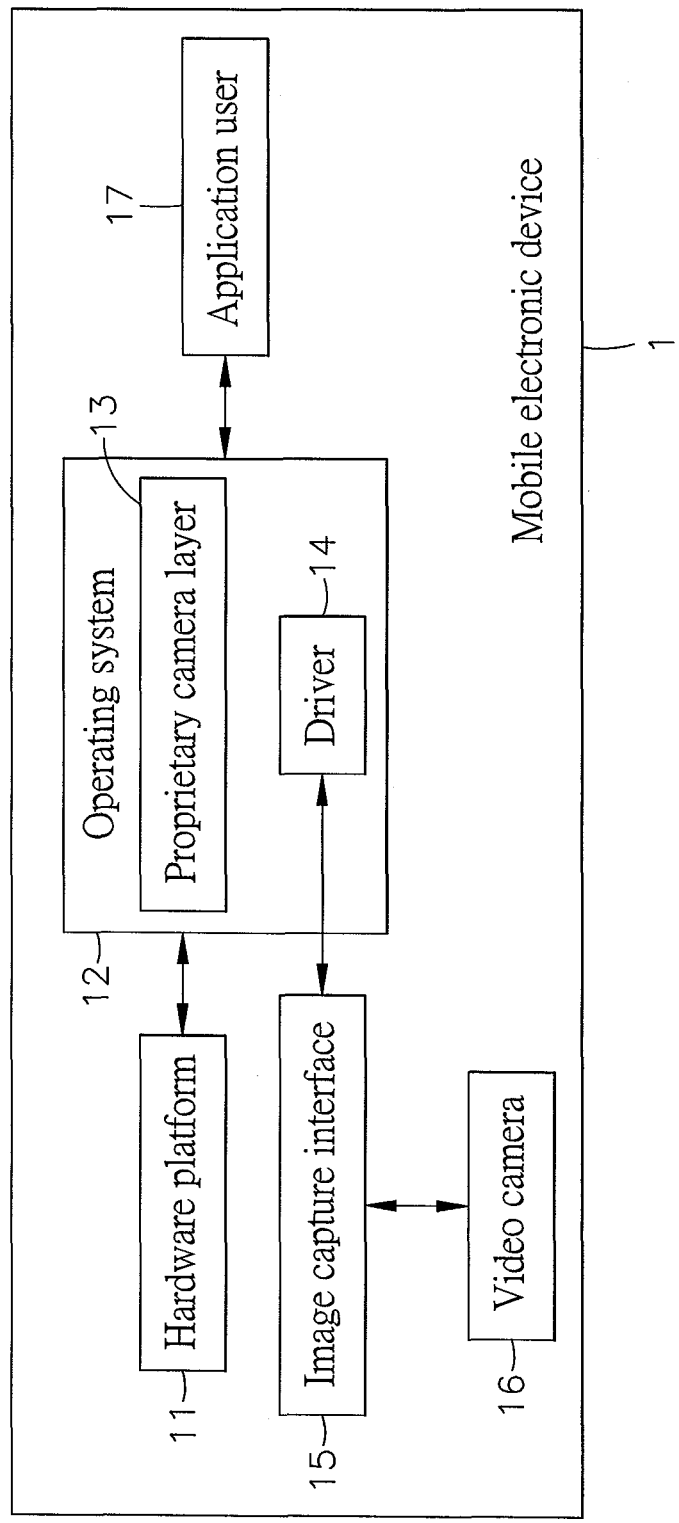
FIG. 1 is a circuit block diagram of a mobile electronic device for the application of a video image distribution method in accordance with the present invention.
Figure 2:
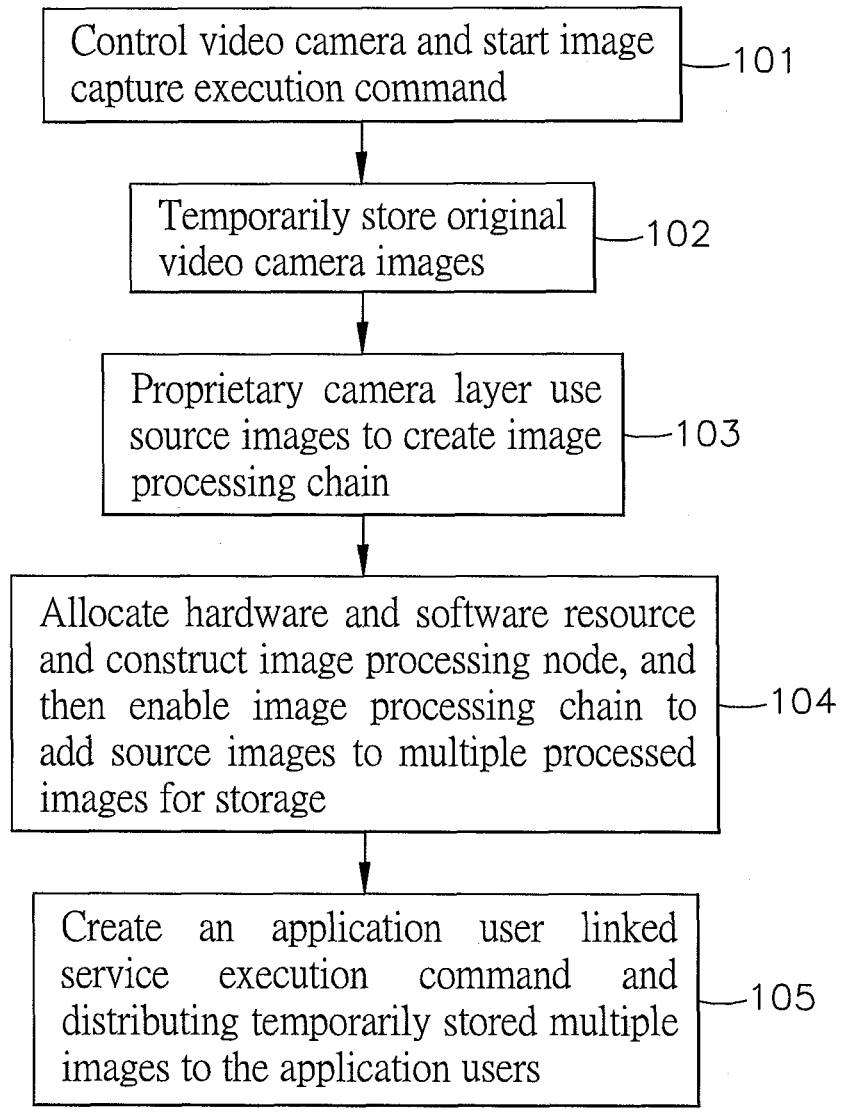
FIG. 2 is a video image distribution method flow chart in accordance with the present invention.
Figure 3:
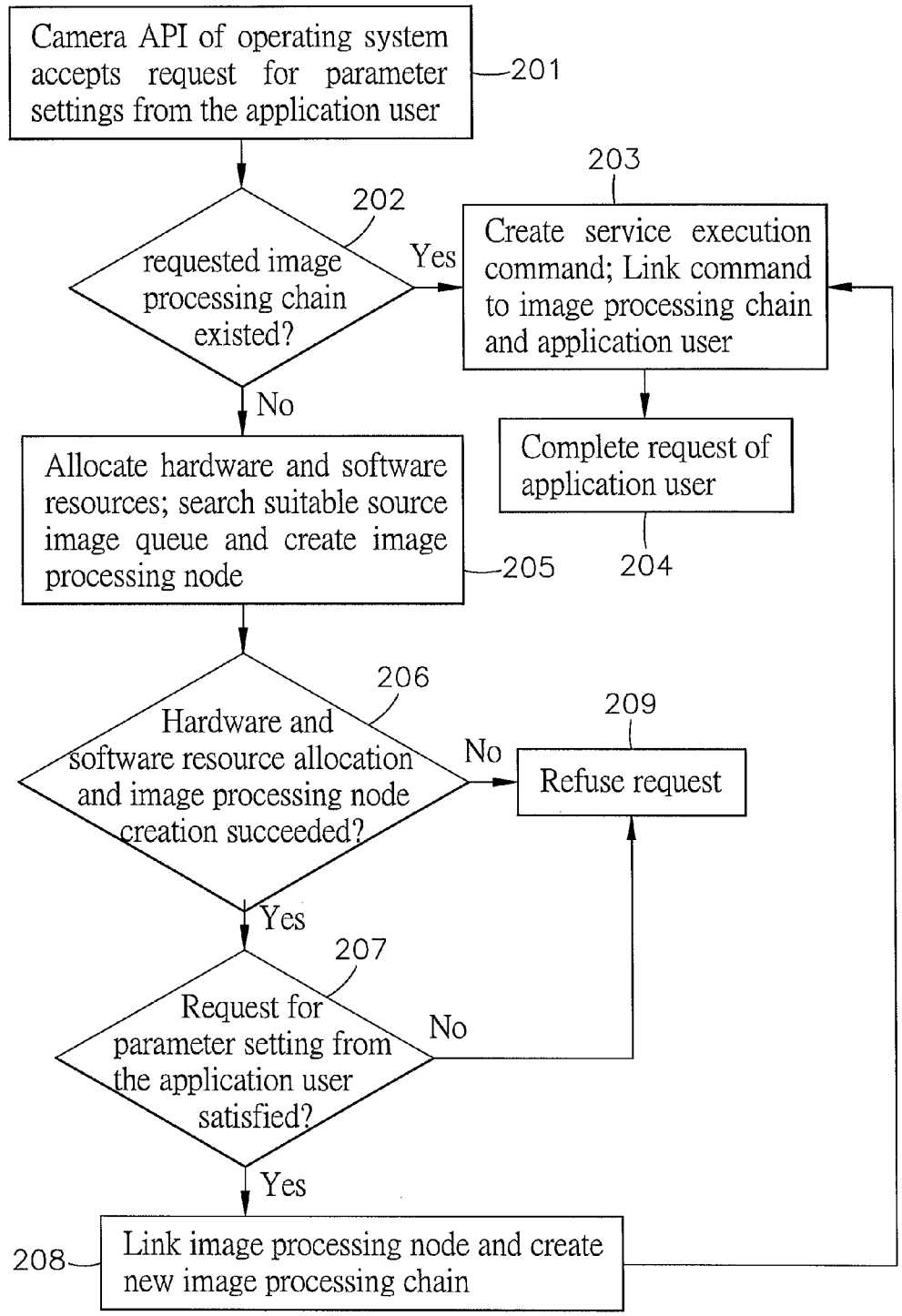
FIG. 3 is a flow chart illustrating the creation of an image processing chain of the video image distribution method in accordance with the present invention.
Figure 4:
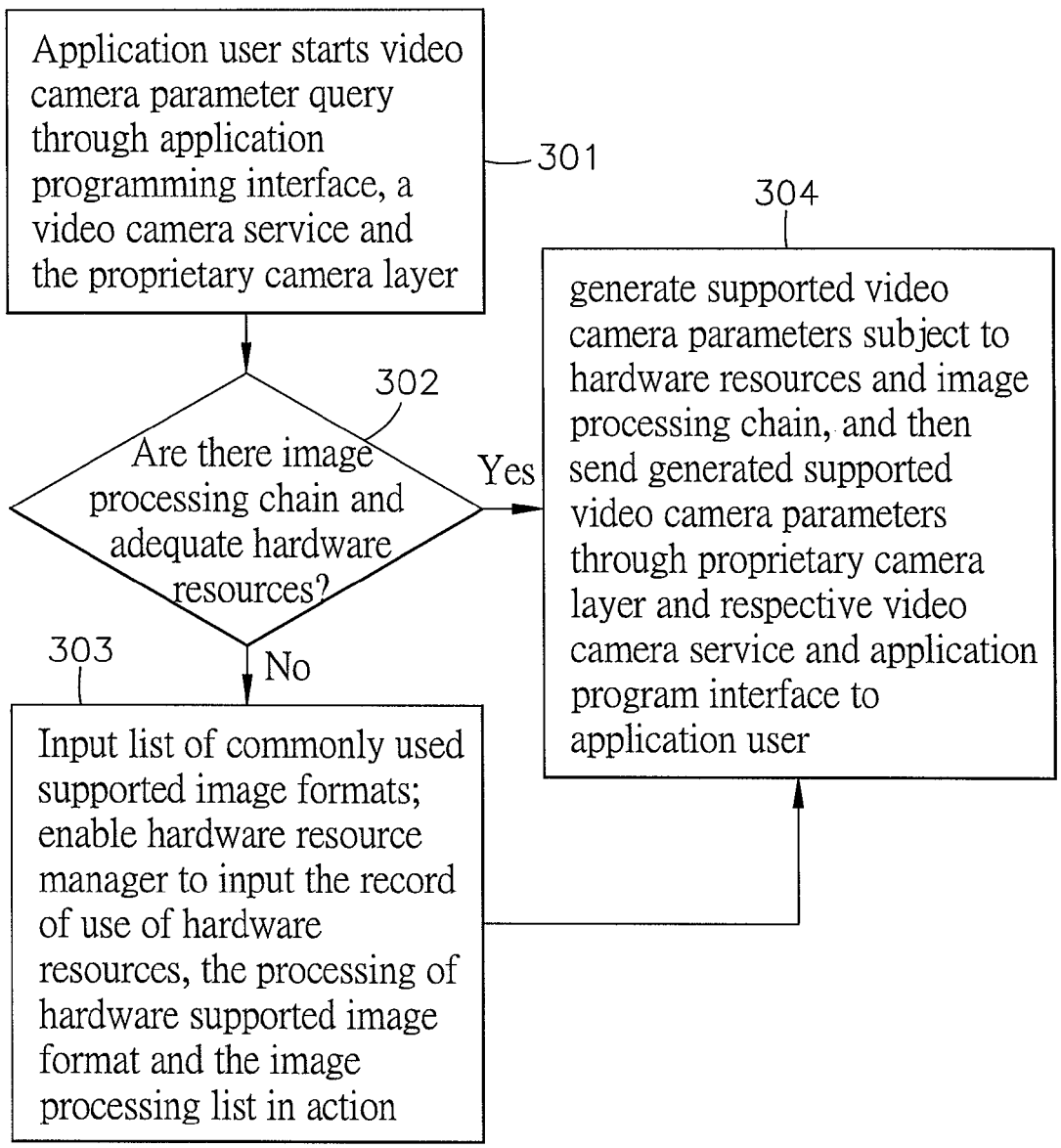
FIG. 4 is a flow chart illustrating the construction of an image processing node of the video image distribution method in accordance with the present invention.

Referring to FIGS. 1-4, a video image distribution method in accordance with the present invention is used in a mobile electronic device 1 (such as smart phone, tablet computer, notebook computer, etc.) that comprises a hardware platform 11, an operating system 12 installed in the hardware platform 11 and having built therein a proprietary camera layer 13 and a driver 14, and an image capture interface 15. The driver 14 of the operating system 12 is controlled to receive video images from a video camera 16 through the image capture interface 15, and to transmit received video images to the proprietary camera layer 13 for dynamically creating image processing chains and multiple images queues for distribution to multiple application users 17.

The hardware platform 11 of the mobile electronic device 1 comprises a CPU, a HW/SW shared memory, a HW camera interface (DMA), an image sensor+ISP (image signal processor), a hardware video encoder, a 2D processor (scaler, color space converter, blitter), and a 3D processor (pixel shader, fragment shader). The operating system 12 can be Linux-based Android operating system comprising Android camera API, Android APIs and Android core services/system frameworks, and LinkNext Proprietary API having the aforesaid proprietary camera layer 13 connected thereto. The proprietary camera layer 13 has built therein a camera recorder, a streaming server, a buffer queue, an image processing and an original camera buffer queue. Further, the proprietary camera layer 13 can also be a software for running an algorithm on a host processor. In actual application, the proprietary camera layer 13 can be a hardware, such as video encoder, post-processor or 2D accelerator, or a software program, such as pixel shader or fragment shader for running a video processing algorism on a GPU (graphic processing unit).

Further, the driver 14 built in the operating system 12 can be Linux kernel comprising a camera driver/V4L2 framework, an Android IPC driver and an Android ION buffer management driver. Thus, the proprietary camera layer 13 and driver 14 of the operating system 12 can be operated through the hardware platform 11 to receive video images from a video camera 16 and to dynamically create image processing chains and multiple images queues for distribution to multiple application users 17. With respect to how the proprietary camera layer 13 creates image processing chains and multiple images queues, and uses the camera image queue to run source image processing through the video encoder, stream buffer queue, scaler, image buffer queue, video encoder or stream buffer queue and then to transmit processed images through the recorder, streaming server or Android API to application users 17 for playing, or to run source image processing through the 2D accelerator or frame buffer and then directly, enabling the processed images to be dynamically displayed through a display or HDMI subject to the control of a LCD controller, these image processing procedures are of the known art and not within the scope of the spirit of the present invention, and thus no further detailed description in this regard will be given.

The video image distribution method comprises the steps of:
(101) controlling the video camera 16 and starting image capture execution command;
(102) temporarily storing original video camera images;
(103) the proprietary camera layer 13 using source images to create image processing chain;
(104) allocating hardware and software resource and constructing image processing node, and then enabling image processing chain to add source images to multiple processed images for storage; and
(105) creating an application user linked service execution command and distributing temporarily stored multiple images to the application users 17.

The image processing chain creation in the aforesaid step (103) comprises the sub steps of:
(201) camera API (application programming interface) of the operating system 12 accepting request for parameter setting from the application user 17.
(202) determining whether or not there is an image processing chain of the parameter setting requested by the application user 17, and then proceeding to step (203) if yes, or step (205) if not;
(203) creating a service execution command and linking the command to the image processing chain and the application user 17;
(204) completing the request of the application user 17;
(205) allocating hardware and software resources, searching a suitable source image queue and creating an image processing node;
(206) determining whether or not hardware and software resource allocation and image processing node creation have been successfully completed, and then, proceeding to step (207) if yes, or step (209) if not;
(207) determining whether or not the request for parameter setting from the application user 17 has been satisfied, and then proceeding to step (208) if yes, or step (209) if not;
(208) linking the image processing node and creating a new image processing chain, and then returning to step (203); and
(209) refusing the request from the application user 17.

In the above-described procedure, the hardware platform 11 of the mobile electronic device 1 receives video images from the video camera 16 through the image capture interface 15 by means of the proprietary camera layer 13 and driver 14 of the operating system 12, and uses the hardware of the video camera 16, the driver 14 and/or the image capture framework to control the operation (aperture, shutter speed, sensitivity, zoom, autofocus, backlight compensation, etc.) of the video camera 16. After obtained the image capture execution command, the proprietary camera layer 13 is enabled to temporarily store the original video camera images in the HW/SW shared memory of the hardware platform 11, and to create data related to the service execution command that is linked to the application user 17. Through the hardware platform 11 and by means of assigned parameters and allocating the hardware and software resources, a image processing chain is dynamically created subject to the source image of the video camera 16 and processed into the desired format (such as image size, color, resolution, dynamic video and audio compression encoding format, grid put rate, data rate, etc.) and then, the processed data is added to processed multiple images for storage. Thereafter, the storage multiple images are distributed to the multiple application users 17. Thus, as long as the hardware and software resources of the hardware platform 11 permits, the video image distribution method enables to the system to serve multiple applications users 17 with requested different image formats, achieving optimization of the mobile electronic device 1 and facilitating the user to use the mobile electronic device 1.

Figure 5:
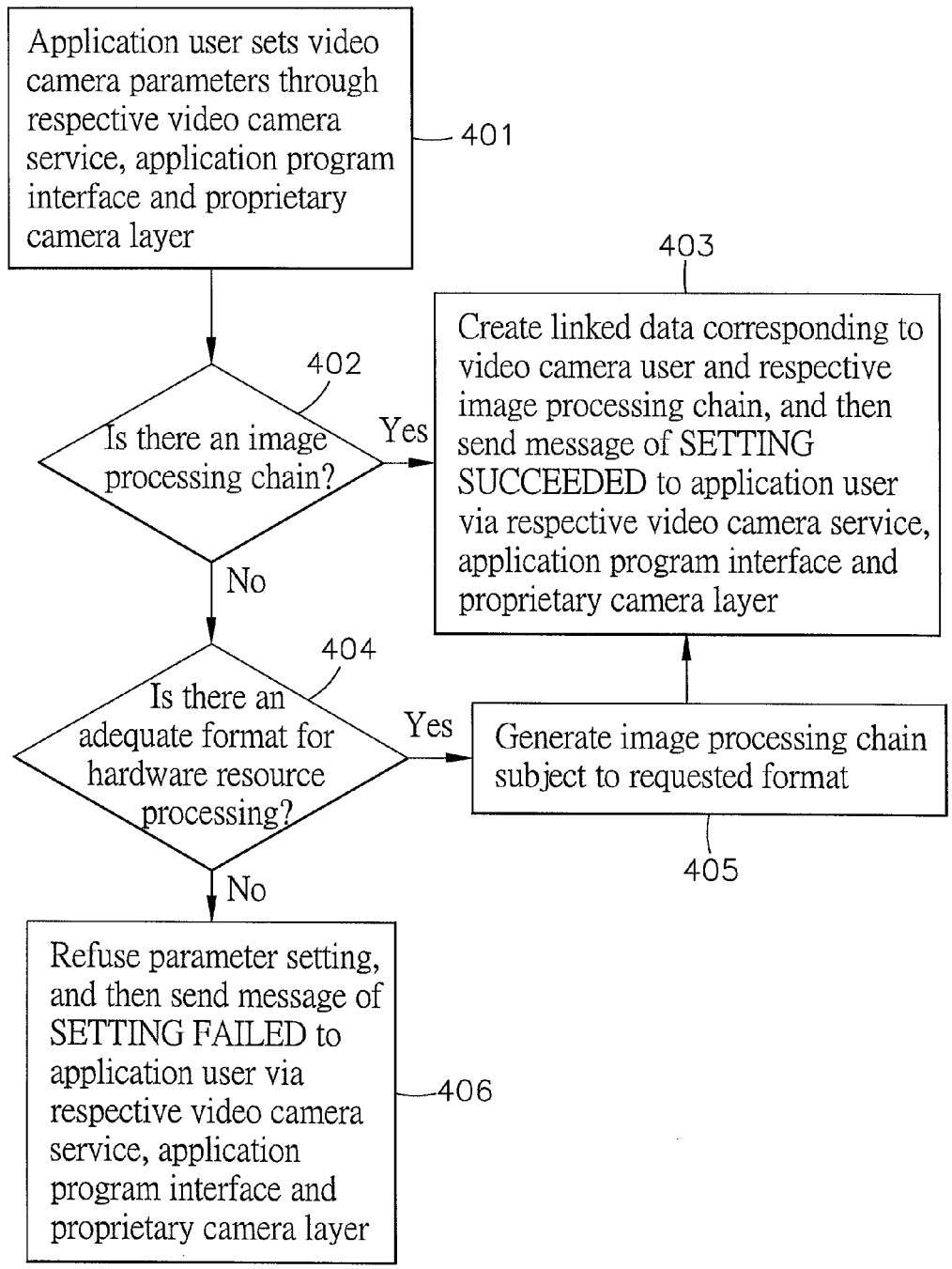
FIG. 5 is a flow chart illustrating the video camera parameter query of the video image distribution method in accordance with the present invention.
Figure 6:
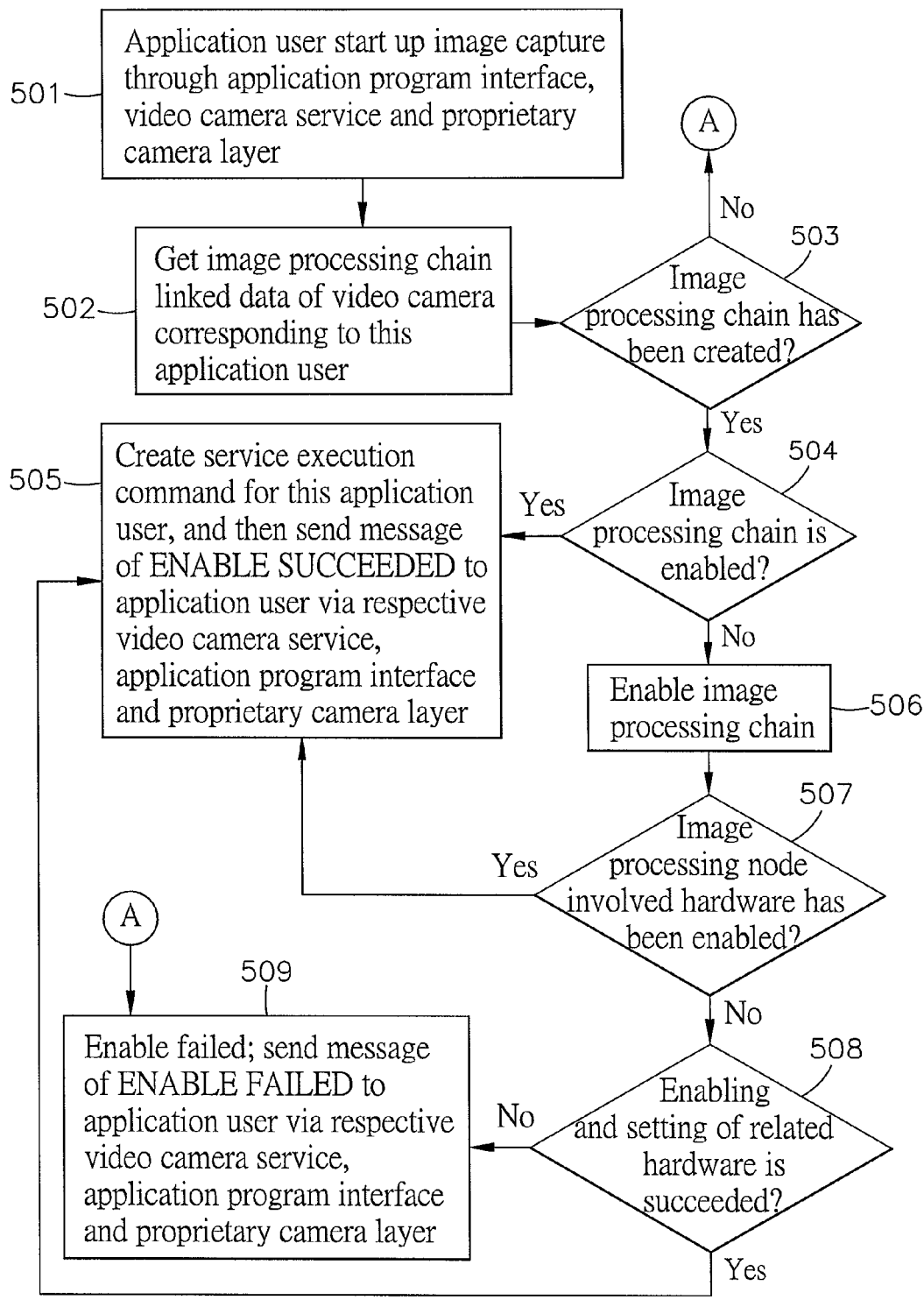
FIG. 6 is a flow chart illustrating the image processing chain enable procedure of the video image distribution method in accordance with the present invention.
Figure 7:
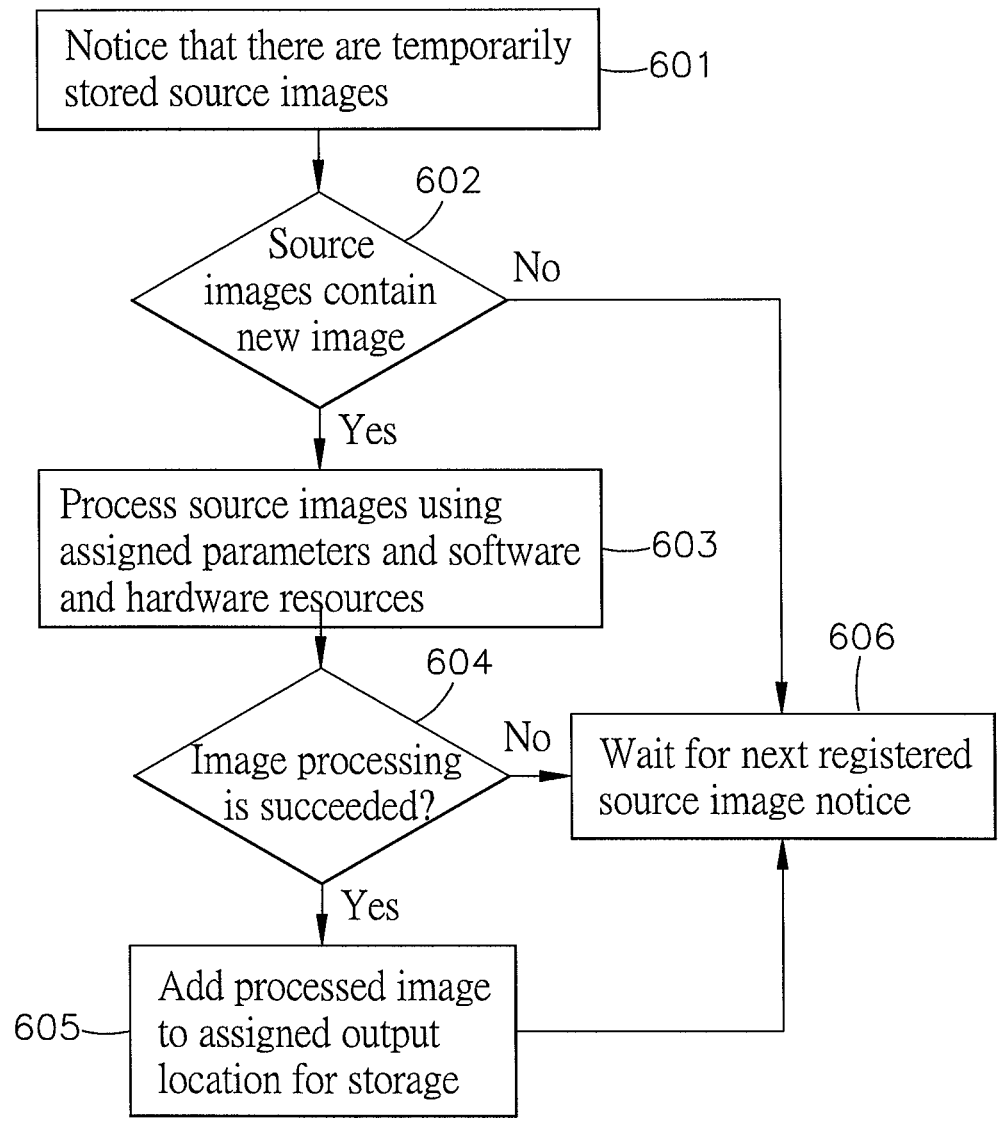
FIG. 7 is a flow chart illustrating the processing of the image processing chain of the video image distribution method in accordance with the present invention.
Figure 8:
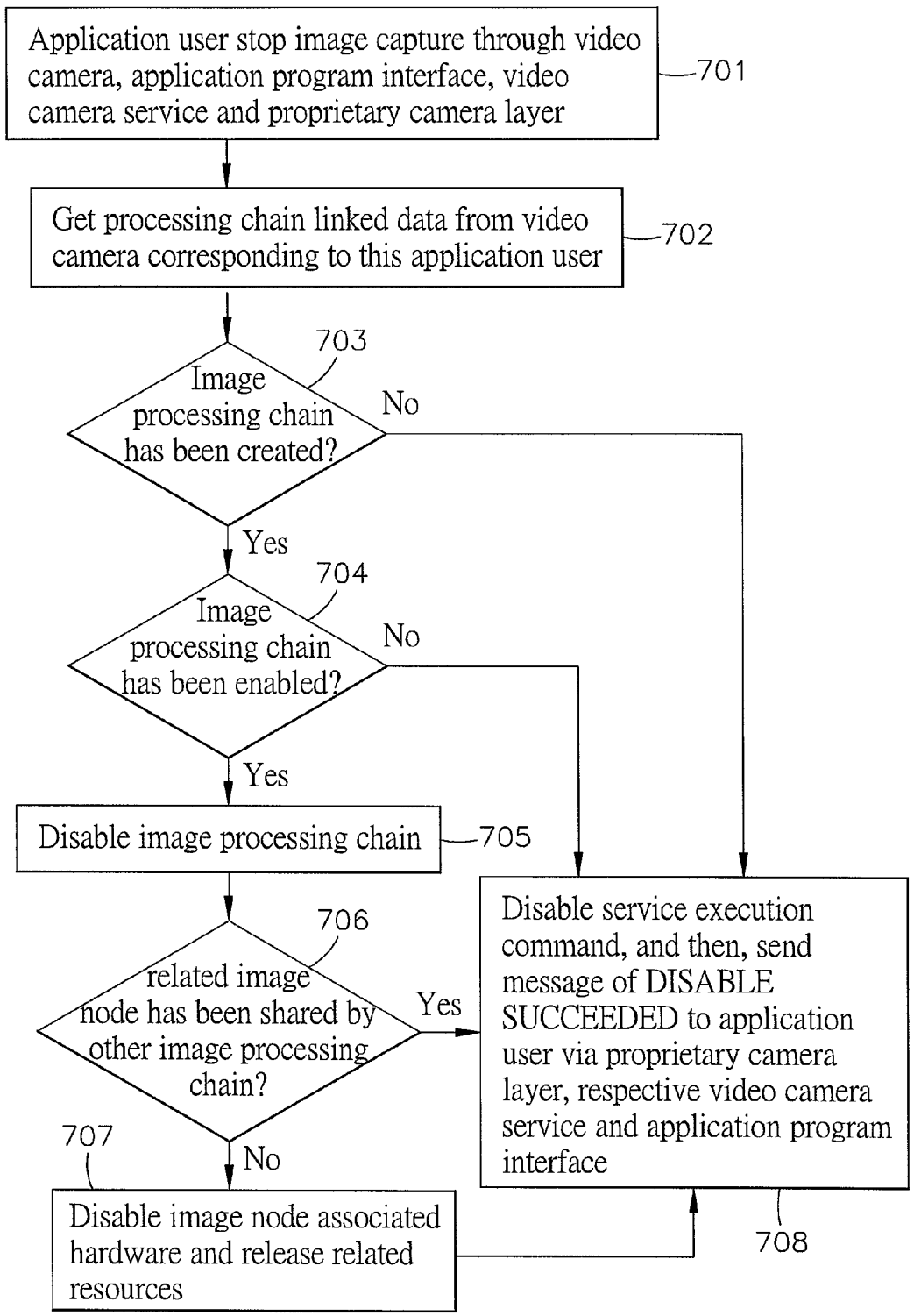
FIG. 8 is a flow chart illustrating the image processing chain disable procedure of the video image distribution method in accordance with the present invention.

Referring to FIGS. 5-8 and FIG. 4 again, the applications users 17 can be Skype, Line, WeChat, Viber or Yahoo Messenger application programming interfaces, or other application programming interfaces (such as Android, iOS, Windows Phone) that are built in the operating system 12.

When one application user 17 makes a video camera parameter query, the procedure comprises the steps of:
(301) the application user 17 starting video camera parameter query by means of an application programming interface, a video camera service and the proprietary camera layer 13;
(302) determining whether or not there is an image processing chain and adequate hardware resources, and then proceeding to step (304) if yes, or step (303) if not;
(303) inputting the list of commonly used supported image formats; enable the hardware resource manager to input the record of use of hardware resources, the processing of hardware supported image format and the image processing list in action, and then proceeding to step (304); and
(304) generating supported video camera parameters subject to the hardware resources and the image processing chain, and then sending the generated supported video camera parameters through the proprietary camera layer 13 and the respective video camera service and application program interface to the application user 17.

As stated above, the application user 17 of the mobile electronic device 1 can inquire video camera parameters through the respective application program interface and video camera service and the proprietary camera layer 13. When an image processing chain and adequate hardware resources are found, the supported video camera parameters can then be generated and sent through the proprietary camera layer 13 and the respective video camera service and application program interface to the application user 17. If neither image processing chain nor adequate hardware resources are found, input the list of commonly used supported image formats, and enable the hardware resource manager to input the record of use of hardware resources, the processing of hardware supported image format and the image processing list in action, and then check again whether or not there are an image processing chain and adequate hardware resources. After the aforesaid procedure is completed, the supported video camera parameters is then generated and sent through the proprietary camera layer 13 and the respective video camera service and application program interface to the application user 17.

When the application user 17 starts to set video camera parameters, the video camera parameter setting procedure comprises the steps of:
(401) the application user 17 setting video camera parameters through the respective video camera service, the application program interface and the proprietary camera layer 13;
(402) checking whether or not there is an image processing chain, and then, proceeding to step (403) if yes, or step (404) if not;
(403) creating a linked data corresponding to the video camera user and the respective image processing chain, and then sending a message of SETTING SUCCEEDED back to the application user 17 via the respective video camera service, the application program interface and the proprietary camera layer 13;
(404) checking whether or not there is an adequate format for hardware resource processing, and then, proceeding to step (405) if yes, or step (406) if not;
(405) generating an image processing chain subject to the requested format, and then returning to step (403); and
(406) refusing parameter setting, and then sending a message of SETTING FAILED back to the application user 17 via the respective video camera service, the application program interface and the proprietary camera layer 13.

As stated above, the application user 17 of the mobile electronic device 1 can set video camera parameters through the respective video camera service, the application program interface and the proprietary camera layer 13. When an image processing chain is found, a linked data corresponding to the video camera user and the respective image processing chain will be then created, and then a message of SETTING SUCCEEDED will be sent to the application user 17 via the respective video camera service, the application program interface and the proprietary camera layer 13. If no image processing chain is found but adequate format for the hardware resources is available, an image processing chain in the desired format will be generated, and a message of SETTING SUCCEEDED will then be sent through the respective video camera service, the application program interface and the proprietary camera layer 13 to the application user 17 after creation of a linked data corresponding to the video camera user and the respective image processing column. If neither image processing chain nor adequate format for the hardware resources is found, the parameter setting will be refused, and a message of SETTING FAILED will then be sent back to the application user 17 via the respective video camera service, the application program interface and the proprietary camera layer 13.

During the above-described step (104), enabling image processing chain comprises the steps of:
(501) the application user 17 starting up image capture through the application program interface, the video camera service and the proprietary camera layer 13;
(502) getting the image processing chain linked data of the video camera 16 corresponding to this application user;
(503) checking whether or not the image processing chain has been created, and then, proceeding to step (504) if yes, or step (509) if not;
(504) checking whether or not the image processing chain is enabled, and then, proceeding to step (505) if yes, or step (506) if not;
(505) creating a service execution command for this application user, and then sending a message of ENABLE SUCCEEDED back to the application user 17 via the respective video camera service, the application program interface and the proprietary camera layer 13'
(506) enabling the image processing chain;
(507) checking whether or not the image processing node involved hardware has been enabled, and then, returning to step (505) if yes, or proceed to step (508) if not;
(508) checking whether or not the enabling and setting of the related hardware is succeeded, and then, returning to step (505) if yes, or proceed to step (509) if not;
(509) enable failed; sending a message of ENABLE FAILED back to the application user 17 via the respective video camera service, the application program interface and the proprietary camera layer 13.

As stated above, the application user 17 of the mobile electronic device 1 can start up the video camera 16 to get images through the application program interface, the respective video camera service and the proprietary camera layer 13 and get the corresponding image processing chain linked data of the video camera. If the image processing chain is created and enabled, a service execution command corresponding to this application user will then be created and a message of ENABLE SUCCEEDED will be sent back to the application user 17 via the respective video camera service, the application program interface and the proprietary camera layer 13. If the image processing chain is not enabled, enable the image processing chain, and then check whether the image node involved hardware is enabled. If the image node involved hardware is enabled, create a service execution command for this user, and then send a message of ENABLE SUCCEEDED back to the application user 17 via the respective video camera service, the application program interface and the proprietary camera layer 13. If the image node involved hardware is not enabled but the enabling and setting of the related hardware is succeeded, repeat the aforesaid step to create a service execution command corresponding to this application user 17, and then send a message of ENABLE SUCCEEDED back to the application user 17 via the respective video camera service, the application program interface and the proprietary camera layer 13. If the image processing chain is not created or the enabling and setting of the related hardware is not succeeded, the enabling is failed. At this time, send a message of ENABLE FAILED back to the application user 17 via the respective video camera service, the application program interface and the proprietary camera layer 13 for further follow-up action.

Further, in the above-described step (104), the processing of the image processing chain comprises the steps of:
(601) noticing that there are temporarily stored source images;
(602) determining whether or not the source images contain a new image, and then proceeding to step (603) if yes, or step (606) if not;
(603) processing the source images using the assigned parameters and software and hardware resources;
(604) determining whether or not the image processing is succeeded, and then, proceeding to step (605) if yes, or step (606) if not;
(605) adding the processed image to the assigned output location for storage and then proceeding to step (606); and
(606) waiting for a next registered source image notice.

After the procedure of distributing temporarily stored multiple images to the application users 17 in the above-described step (105), the procedure of disabling the image processing chain comprises the steps of:
(701) the application user 17 stopping image capture through the video camera 16, the application program interface, the video camera service and the proprietary camera layer 13;
(702) getting the processing chain linked data from the video camera 16 corresponding to this application user;
(703) checking whether or not the image processing chain has been created, and then, proceeding to step (704) if yes, or step (708) if not;
(704) checking whether or not the image processing chain has been enabled, and then, proceeding to step (705) if yes, or step (708) if not;
(705) disabling the image processing chain;
(706) checking whether or not the related image node has been shared by other image processing chain, and then, proceeding to step (708) if yes, or step (707) if not;
(707) disabling the image node associated hardware and releasing the related resources, and then, proceeding to step (708).
(708) disabling the service execution command, and then, sending a message of DISABLE SUCCEEDED back to the application user 17 via the proprietary camera layer 13, the respective video camera service and the application program interface.

As stated above, the application user 17 of the mobile electronic device 1 can stop image capture through the video camera 16, the application program interface, the video camera service and the proprietary camera layer 13, and then get the related image processing chain linked data from the video camera 16 corresponding to this application user 17. If the image processing chain is created and enabled, disable the image processing chain, and then check whether or not the related image node has been shared by other image processing chains? If the related image node has been shared by other image processing chain, disable the service execution command, and then send a message of DISABLE SUCCEEDED back to the application user 17 via the proprietary camera layer 13, the respective video camera service and the application program interface. If no other image processing chain share the related image node, disable the image node associated hardware and release the related resources, and then stop the service thread, and then send a message of DISABLE SUCCEEDED back to the application user 17 via the proprietary camera layer 13, the respective video camera service and the application program interface. If the image processing chain is not created, or if the image processing chain is created but not enabled, disable the service execution command, and then send a message of DISABLE SUCCEEDED back to the application user 17 via the proprietary camera layer 13, the respective video camera service and the application program interface.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A video image distribution method used in a mobile electronic device comprising a hardware platform, an operating system installed in said hardware platform and an image capture interface, said operating system having built therein a proprietary camera layer and a driver, said driver being controlled to receive video images from a video camera through said image capture interface and to transmit received video images to said proprietary camera layer for dynamically creating image processing chains and multiple images queues for distribution to multiple application users, the video image distribution method comprising:
 (a01) controlling said video camera and starting image capture execution command;
 (a02) temporarily storing original video camera images;
 (a03) said proprietary camera layer using source images to create image processing chain;
 (a04) allocating hardware and software resources and constructing an image processing node, and then enabling image processing chain to add source images to multiple processed images for storage;
 (a05) creating an application user linked service execution command and distributing temporarily stored multiple images to multiple application users.

2. The video image distribution method as claimed in claim 1, wherein step (a01) of controlling said video camera and starting image capture execution command uses the hardware of said video camera, said driver and/or said image capture framework to control the operation of said video camera.

3. The video image distribution method as claimed in claim 1, wherein step (a03) of creating image processing chain comprises the sub steps of:
 (b01) a camera API (application programming interface) of said operating system accepting request for parameter settings from one said application user;
 (b02) determining whether there is an image processing chain of the parameter setting requested by the application user, and then proceeding to step (b03) if yes, or step (b05) if not;
 (b03) creating a service execution command and linking said service execution command to the image processing chain and the application user;
 (b04) completing the request of the application user;
 (b05) allocating the hardware and software resources, and then searching a suitable temporarily stored source image and creating an image processing node;
 (b06) determining whether or not the hardware and software resource allocation and image processing node creation are succeeded, and then, proceeding to step (b07) if succeeded, or step (b09) if not succeeded;
 (b07) determining whether the request for parameter setting from the application user is satisfied, and then proceeding to step (b08) if satisfied, or step (b09) if not satisfied;

(b08) linking the image processing node and creating a new image processing chain, and then returning to step (b03); and (b09) refusing the request from the application user.

4. The video image distribution method as claimed in claim 3, wherein when one application user makes a video camera parameter query, the procedure comprises the steps of:

(c01) the application user starting video camera parameter query through an application programming interface, a video camera service and said proprietary camera layer;

(c02) determining whether there is an image processing chain and adequate hardware resources, and then proceeding to step (c04) if yes, or step (c03) if not;

(c03) inputting a list of commonly used supported image formats; enabling the hardware resource manager to input the record of use of hardware resources, the processing of hardware supported image format and the image processing list in action, and then proceeding to step (c04);

(c04) generating supported video camera parameters subject to the hardware resources and the existed image processing chain, and then sending the generated supported video camera parameters through said proprietary camera layer and the respective video camera service and said application program interface to the application user.

5. The video image distribution method as claimed in claim 3, wherein when one application user starts to set video camera parameters, the video camera parameter setting procedure comprises the steps of:

(d01) the application user setting video camera parameters through the respective video camera service, said application program interface and said proprietary camera layer;

(d02) checking whether there is an image processing chain, and then, proceeding to step (d03) if yes, or step (d04) if not;

(d03) creating a linked data corresponding to the video camera user and the respective image processing chain, and then sending a message of SETTING SUCCEEDED back to the application user via the respective video camera service, said application program interface and said proprietary camera layer;

(d04) checking whether there is an adequate format for hardware resource processing, and then proceeding to step (d05) if yes, or step (d06) if not;

(d05) generating an image processing chain subject to the requested format, and then returning to step (d03);

(d06) refusing parameter setting, and then sending a message of SETTING FAILED back to the application user via the respective video camera service, said application program interface and said proprietary camera layer.

6. The video image distribution method as claimed in claim 1, wherein in said step (a04), the procedure of enabling image processing chain comprises the sub steps of:

(e01) the application user starting up image capture through said application program interface, said video camera service and said proprietary camera layer;

(e02) getting the image processing chain linked data of said video camera corresponding to this application user;

(e03) checking whether the image processing chain is created, and then, proceeding to step (e04) if created, or step (e09) if not created;

(e04) checking whether the image processing chain is enabled, and then, proceeding to step (e05) if enabled, or step (e06) if not enabled;

(e05) creating a service execution command for this application user, and then sending a message of ENABLE SUCCEEDED back to the application user via said video camera service, said application program interface and said proprietary camera layer;

(e06) enabling the image processing chain;

(e07) checking whether the image node involved hardware is enabled, and then, returning to step (e05) if enabled, or proceeding to step (e08) if not enabled;

(e08) checking whether enabling and setting of the related hardware is succeeded, and then, returning to step (e05) if succeeded, or proceed to step (e09) if not succeeded; and (e09) enable failed; sending a message of ENABLE FAILED back to the application user via said video camera service, said application program interface and said proprietary camera layer.

7. The video image distribution method as claimed in claim 1, wherein in said step (a04), the processing of the image processing chain comprises the sub steps of:

(f01) noticing that there are temporarily stored source images;

(f02) determining whether or not the source images contain a new image, and then proceeding to step (f03) if yes, or step (f06) if not;

(f03) processing the source images using the assigned parameters and software and hardware resources;

(f04) determining whether or not the image processing is succeeded, and then, proceeding to step (f05) if yes, or step (f06) if not;

(f05) adding the processed image to the assigned output location for storage and then proceeding to step (f06); and (f06) waiting for a next registered source image notice.

8. The video image distribution method as claimed in claim 1, wherein after the procedure of distributing temporarily stored multiple images to said application users in said step (a05), the procedure of disabling the image processing chain comprises the sub steps of:

(g01) the application user stopping image capture through the video camera, the application program interface, the video camera service and the proprietary camera layer;

(g02) getting the processing chain linked data from the video camera corresponding to this application user;

(g03) checking whether or not the image processing chain has been created, and then, proceeding to step (g04) if yes, or step (g08) if not;

(g04) checking whether or not the image processing chain has been enabled, and then, proceeding to step (g05) if yes, or step (g08) if not;

(g05) disabling the image processing chain;

(g06) checking whether or not the related image node has been shared by other image processing chain, and then, proceeding to step (g08) if yes, or step (g07) if not;

(g07) disabling the image node associated hardware and releasing the related resources, and then, proceeding to step (g08);

(g08) disabling the service execution command, and then, sending a message of DISABLE SUCCEEDED back to the application user via the proprietary camera layer, the respective video camera service and the application program interface.

9. The video image distribution method as claimed in claim 1, wherein said hardware platform of said mobile electronic device comprises a CPU, a HW/SW shared memory, a HW camera interface (DMA), an image sensor+ISP (image signal processor), a hardware video encoder, a 2D processor (scaler, color space converter, blitter), and a 3D processor (pixel shader, fragment shader).

10. The video image distribution method as claimed in claim 1, wherein said operating system is selected from the group of Android operating system, iOS operating system and Windows Phone operating system.

11. The video image distribution method as claimed in claim 1, wherein Android operating system comprises Android camera API, Android APIs and Android Core Services/System Frameworks.

12. The video image distribution method as claimed in claim 1, wherein said proprietary camera layer comprises Camera Recorder, Streaming Server, Buffer Queue, Image Processing and Original Camera Buffer Queue.

13. The video image distribution method as claimed in claim 1, wherein said proprietary camera layer is a soft ware for running an algorithm on a host processor.

14. The video image distribution method as claimed in claim 1, wherein said proprietary camera layer is a hardware selected from the group of video encoder, post-processor and 2D accelerator.

15. The video image distribution method as claimed in claim 1, wherein said proprietary camera layer is a pixel shader or fragment shader for running a video processing algorism on a GPU (graphic processing unit).

16. The video image distribution method as claimed in claim 1, wherein said driver is Linux kernel comprising Camera Driver/V4L2 Framework, Android IPC Driver and Android ION Buffer Management Driver.

17. The video image distribution method as claimed in claim 1, wherein said application users of said mobile electronic device are Skype, Line, WeChat, Viber or Yahoo Messenger application programming interfaces.

* * * * *